(12) United States Patent
Manner et al.

(10) Patent No.: US 9,648,079 B2
(45) Date of Patent: May 9, 2017

(54) SYSTEM AND METHOD FOR PROVIDING CONTENT TO A REQUESTING TERMINAL

(71) Applicant: AALTO-KORKEAKOULUSÄÄTIÖ, Espoo (FI)

(72) Inventors: Jukka Manner, Helsinki (FI); Le Wang, Espoo (FI)

(73) Assignee: AALTO-KORKEAKOULAUSÄÄTIÖ, Helsinki (FI)

( * ) Notice: Subject to any disclaimer, the term of this patent is extended or adjusted under 35 U.S.C. 154(b) by 0 days.

(21) Appl. No.: 14/400,119

(22) PCT Filed: May 6, 2013

(86) PCT No.: PCT/EP2013/059387
§ 371 (c)(1),
(2) Date: Nov. 10, 2014

(87) PCT Pub. No.: WO2013/167532
PCT Pub. Date: Nov. 14, 2013

(65) Prior Publication Data
US 2015/0095462 A1    Apr. 2, 2015

(30) Foreign Application Priority Data

May 9, 2012   (FI) ..................................... 20125500

(51) Int. Cl.
*G06F 15/16*   (2006.01)
*H04L 29/08*   (2006.01)

(52) U.S. Cl.
CPC ............ *H04L 67/02* (2013.01); *H04L 67/141* (2013.01); *H04L 67/2847* (2013.01)

(58) Field of Classification Search
CPC .... H04L 67/02; H04L 67/141; H04L 67/2847
See application file for complete search history.

(56) References Cited

U.S. PATENT DOCUMENTS

| | | | | |
|---|---|---|---|---|
| 6,721,780 | B1* | 4/2004 | Kasriel | ............ G06F 17/30902 707/E17.12 |
| 8,069,406 | B2* | 11/2011 | Weiss | ................ G06F 17/30902 715/205 |

(Continued)

OTHER PUBLICATIONS

International Search Report and Written Opinion in PCT Application PCT Application PCT/EP2013/059387, EPO, Jul. 8, 2013.

(Continued)

*Primary Examiner* — Mohamed Wasel

(57) ABSTRACT

A system and method, responsive to receiving a request for content from a terminal, to respond to the terminal with instructions configured to set up a bi-directional communication channel at the terminal for communication between a server and the terminal and to subsequently load the requested content. The requested content comprises at least one referencing object and a plurality of referenced objects belonging to the content. The method and system will generate a modified referencing object by replacing, in the referencing object, links to referenced objects that are external links with modified links that point to a locally stored version of the same object and then to send the referenced objects to the terminal over the bi-directional communication channel. The modified referencing object will be sent to the terminal such that the modified links in the modified referencing object point to referenced objects previously sent to the terminal.

12 Claims, 3 Drawing Sheets

(56) References Cited

U.S. PATENT DOCUMENTS

| | | | |
|---|---|---|---|
| 9,021,047 B2* | 4/2015 | Marquess | G06F 17/30861 709/213 |
| 2003/0023754 A1* | 1/2003 | Eichstadt | G06F 17/30873 709/246 |
| 2005/0182826 A1 | 8/2005 | Knittel | |
| 2008/0114773 A1* | 5/2008 | Choi | G06F 17/30864 |
| 2008/0229021 A1 | 9/2008 | Plamondon | |
| 2010/0281224 A1 | 11/2010 | Ho | |
| 2012/0030305 A1* | 2/2012 | Marquess | G06F 17/30861 709/213 |
| 2013/0238777 A1* | 9/2013 | Raleigh | H04L 67/1097 709/223 |
| 2013/0332814 A1* | 12/2013 | Marlow | G06F 17/30867 715/234 |
| 2014/0143414 A1* | 5/2014 | Deng | H04L 43/04 709/224 |
| 2015/0039601 A1* | 2/2015 | Harrang | G06F 17/30867 707/727 |

OTHER PUBLICATIONS

International Preliminary Report on Patentability in PCT/EP2013/059387, EPO, Aug. 22, 2014.

* cited by examiner

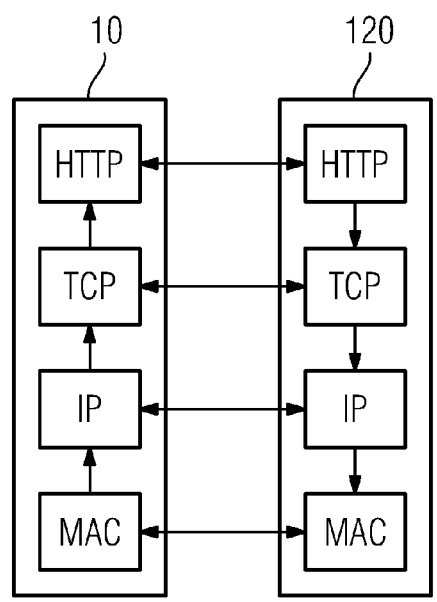
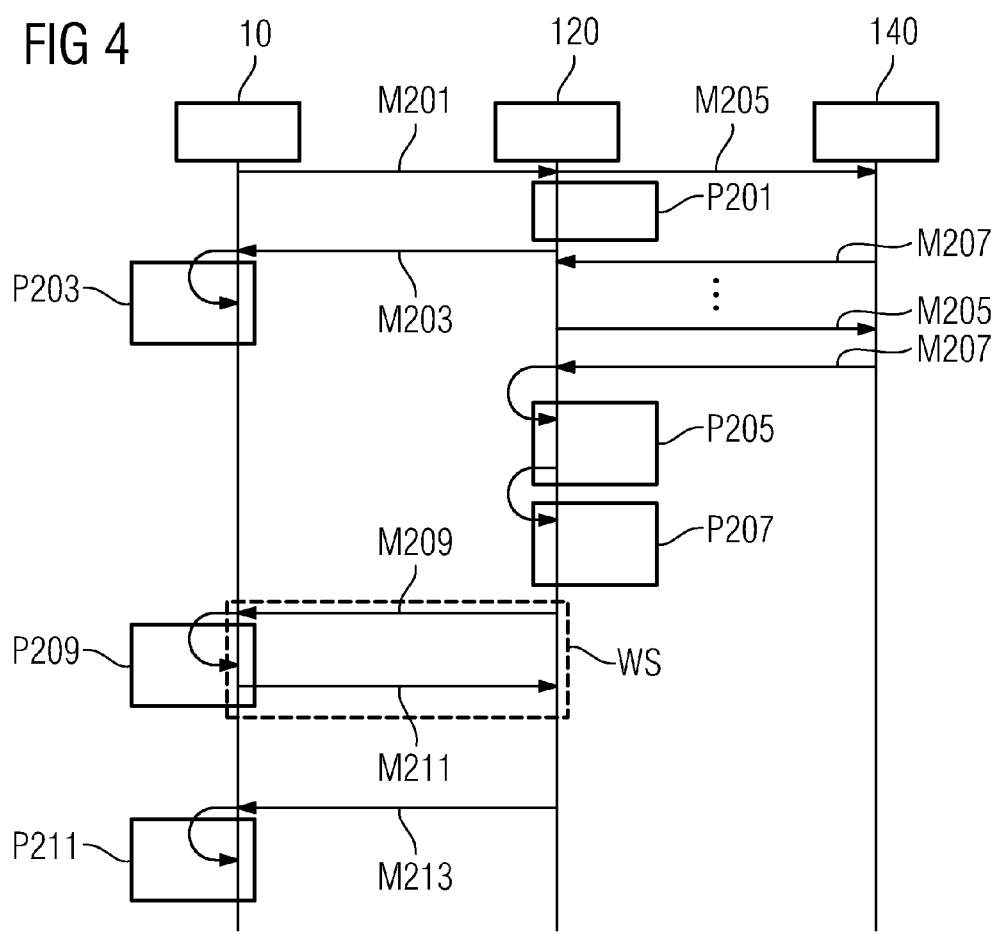

SYSTEM AND METHOD FOR PROVIDING CONTENT TO A REQUESTING TERMINAL

FIELD OF THE INVENTION

The invention relates generally to data processing and more particularly to retrieving of content.

BACKGROUND ART

In the following, with content we mean any content that is loaded in bursts. In particular, content may be loaded from the Internet and include at least one dynamic web page that is a web page that is prepared with fresh information (content and/or layout) for each individual viewing. In this context, the term content would refer specifically to web content.

Content is normally loaded at a terminal (the term "terminal" in the following may in particular but not necessarily refer to a mobile terminal or mobile device but it can be a desktop or a laptop or any other client device) to a browser piece by piece. First, a description of the dynamic page, such as a Hypertext Markup Language (HTML) page is loaded. The browser parses the HTML page and submits then separate requests for each piece that with the description of the dynamic page thus form the dynamic content. Currently, it is normal that a single content contains some 30-100 web objects that must be loaded, not rarely from different locations. The web objects may include images, advertisement banners, flash animations etc.

The energy consumption of a terminal that is loading a content is usually higher during the loading as compared with the terminal in its idle state, that is, when the user is reading the content that already has been loaded.

In addition, it may be that the loading itself takes longer than expected, in particular when some of the web objects cannot be retrieved. Even if the web objects could be retrieved, it may be that they must be retrieved from a remote server which is prone to increase the duration of the retrieval, especially if the retrieving is carried out over a slow link that may be a wireless link.

There are some methods that can be used to reduce energy consumption during loading of contents. In the GPRS or 3GPP standards, the wireless terminal loading a dynamic content should enter in idle state after a predetermined time has lapsed, if the requested content is not being transmitted to the terminal. Since transforming the terminal to the idle state requires some signalling, some mobile phone models are believed (cf. Network Efficiency Task Force Fast Dormancy Best Practices, GSM Association, May, 2010) to enter a sleep state aggressively in order to extend battery life and minimize network congestion but may cause signal load problems in the operator network. During browsing, the mobile device has no chance to enter idle or low power state due to HTTP requests and replies going forth and back.

RRC state transition model has remained rather unchanged through several releases, namely, Rel. 99, Rel. 05 and Rel. 06. Perala et al. present in "Theory and practice of RRC state transitions in UMTS networks", in Proc. Fifth IEEE Broadband Wireless Access Workshop (BWA), co-located with IEEE GLOBECOM 2009, Hawaii, USA, November-December 2009 a methodology to discover RRC configuration parameters without operator involvement or cooperation, which shows how the operator network settings may differ drastically from each other.

Feng Qian et al. in "Characterizing Radio Resource Allocation for 3G Networks", in ACM Internet Measurement Conference (IMC) 2010, Melbourne, Australia, and Feng Qian et al. in "TOP: Tail Optimization Protocol for Cellular Radio Resource Allocation" in IEEE ICNP 2010, Kyoto Japan characterize the impact of operational state machine settings and show that tail time period matching the in-activity timer value before a state demotion. During a tail time, a user equipment still occupies transmission channels and its radio power consumption is kept at the corresponding level of the state, even through there is no traffic transmitted during the period.

Signals Research Group shows in "Reducing the impact of smartphone-generated signaling traffic while increasing the battery life of the phone through the use of network optimization techniques" (May 2010) how signaling traffic generated by smartphones affects battery life and causes network congestion.

In addition to the Fast Dormancy Best Practices paper, "Understanding Smartphone Behavior in the Network" by Nokia Siemens Networks Smart labs (2011) also discusses the timer problem and shows that fast dormancy is one of the solutions, which forces devices to hop back to low power consumption state quickly to save energy and reduce traffic load.

OBJECTIVE OF THE INVENTION

The inventors have found out that it is advantageous if the referenced objects belonging to a content are first retrieved by a server and then sent to the terminal requesting the content only after the server has received all or at least most referenced objects belonging to the content. This arrangement enables a more efficient transmission of data from the server to the terminal. The solution has been disclosed in more detail in patent application PCT/EP2012/053214, still unpublished at the date of the first patent filing of the present invention.

The arrangement described in the preceding paragraph may be used to improve the energy efficiency at the terminal when contents are received at the terminal.

The solutions referred to in the previous section may require modifications at the terminal. Even though the proposed solution can reduce power consumption significantly, there still exists the need for more flexibility of deploying the bundling concept. Having the way of operation of a terminal—in particular a mobile terminal—reprogrammed, can be difficult in view of the rather large number of different operating systems and versions, manufacturers and device types involved. In addition, reprogramming a terminal is not considered to be a transparent method since different data processing would be, required at the server depending on whether a particular terminal has been reprogrammed or not.

Therefore, it is an objective of the present invention to increase transparency in downloading content to a terminal from a server.

SUMMARY OF THE INVENTION

The present invention features a Hyper Text Transfer Protocol (HTTP) server (120) configured to in response to receiving a HTTP request (M201) for content (C) from a terminal (10) over a first communication channel, respond (P201) to the terminal (10) with a Hyper Text Markup Language (HTML) response (M203) containing instructions configured to set up a bi-directional second communication channel (WS) at the terminal (10) in the form of a standard WebSocket connection, for establishing bi-directional communication between the HTTP server (120) and the terminal (10) over the bi-directional second communication channel (WS).

The HTTP server (120) next loads (M205, M207) the requested content (C) comprising at least one referencing object (A) and a plurality of referenced objects (B1, B2, B3, . . . ) belonging to the requested content (C), wherein the referencing object (A) is a hypertext markup language page and the referenced objects (B1, B2, B3, . . . ) are web objects referred to in the hypertext markup language page, following which the HTTP server (120) generates a modified referencing object (AM) by replacing, in the referencing object (A), links (L1, L2, L3, . . . ) to the plurality of referenced objects (B1, B2, B3, . . . ) that are external links with modified links (ML1, ML2, ML3, . . . ), the modified links (ML1, ML2, ML3, . . . ) pointing to a locally stored version of the plurality of referenced objects (B1, B2, B3, . . . ).

The HTTP server (120) is configured to then send the plurality of referenced objects (31, B2, B3, . . . ) to the terminal (10) over the bi-directional second communication channel (WS) and after the HTTP server (120) has sent the plurality of referenced objects (B1, B2, B3, . . . ) to the terminal (10) over the bi-directional second communication channel (WS), to send the modified referencing object (AM) to the terminal (10) over the bi-directional second communication channel (WS) in such a manner that the modified links (ML1, ML2, ML3) in the modified referencing object (AM) point to the plurality of referenced objects (B1, B2, B3) already sent to the terminal (10) over the bi-directional second communication channel (WS).

In one embodiment, the HTTP server (120) is configured to send the plurality of referenced objects (B1, B2, B3, . . . ) to the terminal (10) over the bi-directional second communication channel (WS) in at least one bundle and in another embodiment, to send the plurality of referenced objects (B1, B2, B3, . . . ) to the terminal (10) in at least one bundle after having sent instructions (M203) to set up the bi-directional second communication channel (WS) and instructions to save the referenced objects (B1, B2, B3, . . . ) locally at the terminal (10).

In another embodiment, the HTTP server (120) is configured to send the modified referencing object (AM) to the terminal (10) over the bi-directional second communication channel (WS) as a HTTP response.

In a further embodiment, the present invention features a method for operating a HTTP server (120) wherein the method comprises the acts of in response to receiving a Hyper Text Transfer Protocol (HTTP) request (M201) for content (C) from a terminal (10) over a first communication channel, the HTTP server is programmed to perform the acts of responding to the terminal (10) with a Hyper Text Markup Language (HTML) response (M203) containing instructions configured to set up a bi-directional second communication channel (WS) at the terminal (10) in the form of a standard WebSocket connection, for establishing bi-directional communication between the HTTP server (120) and the terminal (10) over the bi-directional second communication channel.

The method next causes the HTTP server (120) to load (M205, M207) the requested content (C) comprising at least one referencing object (A) and a plurality of referenced objects (B1, B2, B3, . . . ) belonging to the content (C), wherein the at least one referencing object (A) is a hypertext markup language page and the plurality of referenced objects (B1, B2, B3, . . . ) are web objects referred to in the hypertext language page. The HTTP server (120) next generates a modified at least one referencing object (AM) by replacing, in the referencing object (A), a plurality of links (L1, L2, L3, . . . ) to a corresponding plurality of referenced objects (B1, B2, B3, . . . ) that are external links with modified links (ML1, ML2, ML3, . . . ) that point to a locally stored version of each of the same plurality of referenced objects (B1, B2, B3, . . . ).

The HTTP server (120) next sends the plurality of referenced objects (B1, B2, B3, . . . ) to the terminal (10) over the bi-directional second communication channel (WS) and subsequent to sending the plurality of referenced objects (B1, B2, B3, . . . ) to the terminal (10) over the bi-directional second communication channel (WS), the HTTP server (120) sends the modified referencing object (AM) to the terminal (10) over the bi-directional second communication channel (WS) in such a manner that the modified links (ML1, ML2, ML3, . . . ) in the modified referencing object (AM) point to referenced objects (B1, B2, B3, . . . ) already sent to the terminal (10).

In another embodiment of the present invention, the server (120) is operated in such a way that the plurality of referenced objects (B1, B2, B3, . . . ) are sent to the terminal (10) in at least one bundle while in another embodiment the plurality of referenced objects (B1, B2, B3, . . . ) are sent to the terminal (10) in at least one bundle after the server having performed the act of sending instructions (M203) to the terminal (10) to set up the bi-directional second communication channel (WS) and instructions to the terminal (10) to save the plurality of referenced objects (B1, B2, B3, . . . ) locally at the terminal (10).

In another embodiment, the HTTP server (120) is configured to send the modified referencing object (AM) to the terminal (10) as a HTTP response while in a further embodiment, the system includes a plurality of terminals (10) that preferably are mobile terminals, and wherein: the HTTP server (120) is configured for responding to HTTP requests (M201) for content that have been sent by one or more of the plurality of terminals (10).

In yet another embodiment, the HTTP server (120) responds to each of the one or more of the plurality of terminals (10) requesting (M201) content (C) with an HTML response (M203) containing instructions configured to set up a bi-directional second communication channel (WS) in the form of a WebSocket connection at the one or more of the plurality of terminals (10) requesting content (C), for establishing a bi-directional second communication channel (WS) between the HTTP server (120) and the terminal (10) requesting content (C). The HTTP server (120) is configured to load (M205, M207) the requested content (C) comprising at least one referencing object (A) and the plurality of referenced objects (B1, B2, B3, . . . ) belonging to the requested content (C).

In this embodiment, the referencing object (A) is preferably a hypertext markup language page and the plurality of referenced objects (B1, B2, B3, . . . ) are web objects referred to in the hypertext language page and the HTTP server (120) is configured to generate a modified referencing object (AM) by replacing, in the referencing object (A), links (L1, L2, L3, . . . ) to the plurality of referenced objects (B1, B2, B3, . . . ) that are external links, with modified links (ML1, ML2, ML3, . . . ) that point to a locally stored version of the same object (B1, B2, B3, . . . ).

The HTTP server (120) sends the plurality of referenced objects (B1, B2, B3, . . . ) to the terminal (10) over the bi-directional communication channel (WS), and subsequent to the HTTP server (120) sending the plurality of referenced objects (B1, B2, B3, . . . ) to the terminal (10) over the bi-directional second communication channel (WS), the HTTP server (120) sends the modified referencing object (AM) to the terminal (10) in such a manner that the modified links (ML1, ML2, ML3) in the modified referencing object (AM) point to plurality of referenced objects (B1, B2, B3) already sent to the terminal (10).

An additional feature of the present invention is that in one or more embodiments, the Hyper Text Markup Language (HTML) response (M203) from the HTTP server (120) to the terminal (10) containing instructions configured to set up a bi-directional second communication channel (WS) at the terminal (10) in the form of a standard WebSocket connection further includes instructions from the HTTP server (120) to the terminal (1) over the bi-directional second communication channel (WS) causing the terminal (10) to set up a file system according to the FileSystem standard; receive web objects over the bidirectional second communication channel (WS) set up as a standard WebSocket connection; and store the received plurality of referenced objects (B1, B2, B3, . . . ) in memory of the terminal (10) according to the FileSystem standard, the memory allocated by a web browser operating on the terminal (10).

After the HTTP server (120) sends the plurality of referenced objects (B1, B2, B3, . . . ) to the terminal (10) over the bi-directional second communication channel (WS) and after the plurality of referenced objects (B1, B2, B3, . . . ) are stored in the allocated terminal (10) memory, the terminal (10) configured to send a notification (M211) to the HTTP server (120) over the bi-directional second communication channel (WS) causing the HTTP server (120) to send the modified referencing object (AM) to the terminal (10) over the bi-directional second communication channel (WS).

In yet a further embodiment, the Hyper Text Markup Language (HTML) response (M203) from the HTTP server (120) to the terminal (10) containing instructions configured to set up a bi-directional second communication channel (WS) at the terminal (10) in the form of a standard WebSocket connection further includes instructions from the HTTP server (120) over the bi-directional second communication channel (WS) causing the terminal (10) to set up a file system according to the FileSystem standard; receive the plurality of referenced objects (B1, B2, B3, . . . ) over the bidirectional second communication channel (WS) set up as a standard WebSocket connection; and store the received plurality of referenced objects (B1, B2, B3, . . . ) in memory of the terminal (10) according to the FileSystem standard, the memory allocated by a web browser operating on the terminal (10).

After the HTTP server (120) sends the plurality of referenced objects (B1, B2, B3, . . . ) to the terminal (10) over the bi-directional second communication channel (WS) and after the plurality of referenced objects (B1, B2, B3, . . . ) are stored in the allocated terminal (10) memory, the HTTP server (120) is configured for receiving from the terminal (10), over the bi-directional second communication channel (WS), a notification (M211) causing the HTTP server (120) to send the modified referencing object (AM) to the terminal (10) over the bi-directional second communication channel (WS).

ADVANTAGES OF THE INVENTION

With a server that is configured to:
a) in response to receiving a request for content from a terminal over a first communication channel, to respond to the terminal with a response containing instructions configured to set up a bi-directional second communication channel at the terminal for communication between the server and the terminal;
b) to load the content comprising at least one referencing object and a plurality of referenced objects belonging to said content;
c) to generate a modified referencing object by replacing in the referencing object such links to referenced objects that are external links with modified links that point to a locally stored version of the same object;
d) to send the referenced objects to the terminal over the bi-directional second communication channel; and
e) to send the modified referencing object to the terminal, in such a manner that the modified links in the modified referencing object point to referenced objects already sent to the terminal, the downloading of content to the terminal can be made in a manner completely transparent at the terminal which was not the case with any of the solutions referred to above.

Analogously, with a method for operating a server that comprises the steps of:
a) in response to receiving a request for content from a terminal over a first communication channel, responding to the terminal with a response containing instructions configured to set up a bi-directional second communication channel at the terminal for communication between the server and the terminal;
b) loading the content comprising at least one referencing object and a plurality of referenced objects belonging to said content;
c) generating a modified referencing object by replacing in the referencing object such links to referenced objects that are external links with modified links that point to a locally stored version of the same object;
d) sending the referenced objects to the terminal over the bi-directional second communication channel; and
e) sending the modified referencing object to the terminal, in such a manner that the modified links in the modified referencing object point to referenced objects already sent to the terminal, the downloading of content to the terminal can be made in a manner completely transparent at the terminal which was not the case with any of the solutions referred to above.

Our main idea is that, by using the server and the method, the terminal receives a response from the server. Because the response contains instructions configured to set up a bi-directional second communication channel at the terminal for communication between the server and the terminal, the referenced objects can be transferred over the bi-directional second communication channel between the server and the terminal i.e. not over the same protocol or channel that is used to transmit requests for content and responses to such requests. This separation makes it possible to transmit the referenced objects together in a single transfer. This can surprisingly be used, since when the bi-directional configuration channel is not active, also the terminal does not need to be active, to save energy during such non-active periods. This is different from HTTP pipelining. HTTP pipelining allows the terminal to request and receive multiple objects from the same originating server over the same transport connection, while in our idea the whole content is collected together from potentially multiple sources and then sent through a single transport connection. According to our idea, there are much less HTTP GET requests coming from the terminal necessary, since the server sends all objects directly to the client.

When the server is configured to send the modified referencing object to the terminal only after the server has sent the referenced objects to the terminal, the terminal already has the referenced objects locally available and can thus use the referencing object without delay.

Most advantageously, the server is configured to set up the bi-directional second communication channel as a WebSocket. WebSocket is being standardized by the W3C, and the WebSocket protocol has been standardized by the IETF as RFC 6455. "File API: Directories and System" is now W3C working draft, which defines an API to navigate file system hierarchies, and defines a means by which a user agent may expose sandboxed sections of a user's local filesystem to web applications (cf. http://www.w3.org/TR/file-system-api/). Advantageously, the instructions of setting up WebSocket and Storing referenced objects are all generated in one processing step (P201, cf. FIG. 4). Currently, WebSocket is supported by almost all desktop browsers, and of mobile browsers by IOS Safari and Opera Mobile (cf. http://caniuse.com/websockets). It seems File API is now only support by Google Chrome and no mobile browser supports it (cf. http://www.html5rocks.com/en/tutorials/file/filesystem/). In our current implementation, the referencing object is a hypertext markup language page and the referenced objects are web objects referred to in said hypertext language page. If the server is configured to send the referenced objects to the terminal in a bundle, the communication over the WebSocket may be done more efficiently as the sending of the bundle can be done at one go, in contrast to sending the referenced objects one by one. In addition, now the terminal has a chance to enter low power consumption state while the server is loading and bundling and before it sends the reply to the terminal. The chances are increased even more when this concept is used together with the fast dormancy concept as referred to above. Most advantageously the bundle is sent only after having sent instructions to set up a WebSocket and instructions to save the referenced objects locally at the terminal.

A system comprises at least one server according to the previous aspect of the present invention, and a plurality of terminals that preferably are mobile terminals. The system is configured to use the at least one server for responding to requests for content that have been sent by the terminals.

LIST OF DRAWINGS

In the following, the invention is described in more detail with reference to the example in the attached drawings in FIGS. 1 to 4, of which:

FIG. 3 illustrates the server sending the modified referencing object to the terminal for the terminal then to load the objects to browser;

FIG. 4 illustrates signalling between the terminal, server and a remote server.

The same reference numerals and symbols refer to same components in all FIG.

DETAILED DESCRIPTION

Figure 1:
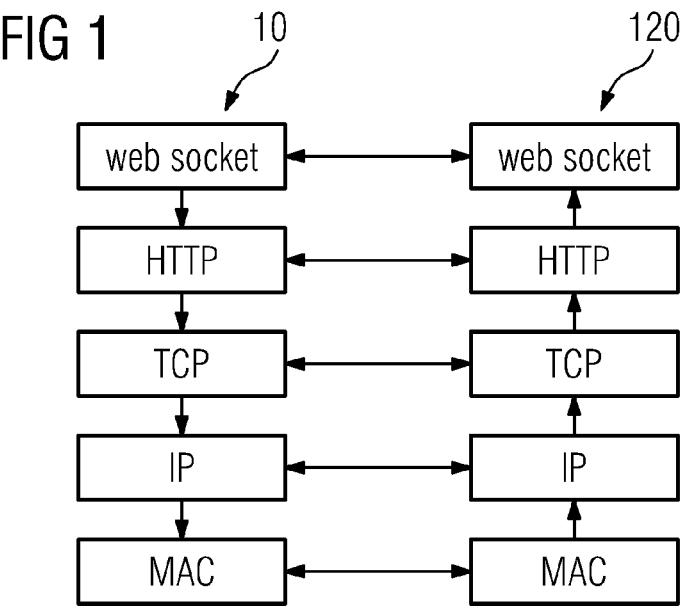
FIG. 1 illustrates the server setting up a WebSocket between terminal and server.

FIG. 1 illustrates server 120 setting up a WebSocket WS between terminal 10 and server 120. The server 120 may in particular be a proxy server (network proxy) but, alternatively, it may be a content server. The terminal 10 may be any client device, in particular it may be a wireless or mobile device or wireless or mobile terminal such as a smart phone or PDA, or a computer device, such as in particular a desktop, notebook or tablet computer.

The terminal 10 and server 120 both have at least one protocol stack suitable for bi-directional communication. In particular, in the protocol stack, Media Access Control (MAC), Internet Protocol (IP), Transfer Control Protocol (TCP), Hypertext Transfer Protocol (HTTP), have preferably been implemented. The preferred embodiment of the invention is in the following discussed with reference to the signalling diagram in FIG. 4 and the protocol stack illustrations in FIGS. 1 to 3.

Terminal 10 sends to server 120 request M201 that most preferably is a HTTP request, in particular request M201 may be a request for a web page, but in principle it can be a request for any content C.

In return, server 120 generates (step P201) and sends response M203 to terminal 10. Response M203 comprises most preferably a Hypertext Markup Language (HTLM) page that comprises instructions to set up a WebSocket WS between terminal 10 and server 120, and instructions to store referenced objects B1, B2, B3, . . . at terminal 10. Terminal 10 sets up the WebSocket WS in step P203. In addition, if the terminal 10 receives the referenced objects B1, B2, B3, . . . in at least one bundle, the response M203 may contain instructions to the terminal 10 to unbundle the referenced objects B1, B2, B3, . . . from the bundle. Server 120 sends a set of requests M205 to at least one web server 140 (or to any other remote server) and receives a set of responses M207. It is to be understood that there may be one or more remote or web servers 140 that each receive at least one request M205.

Figure 5:
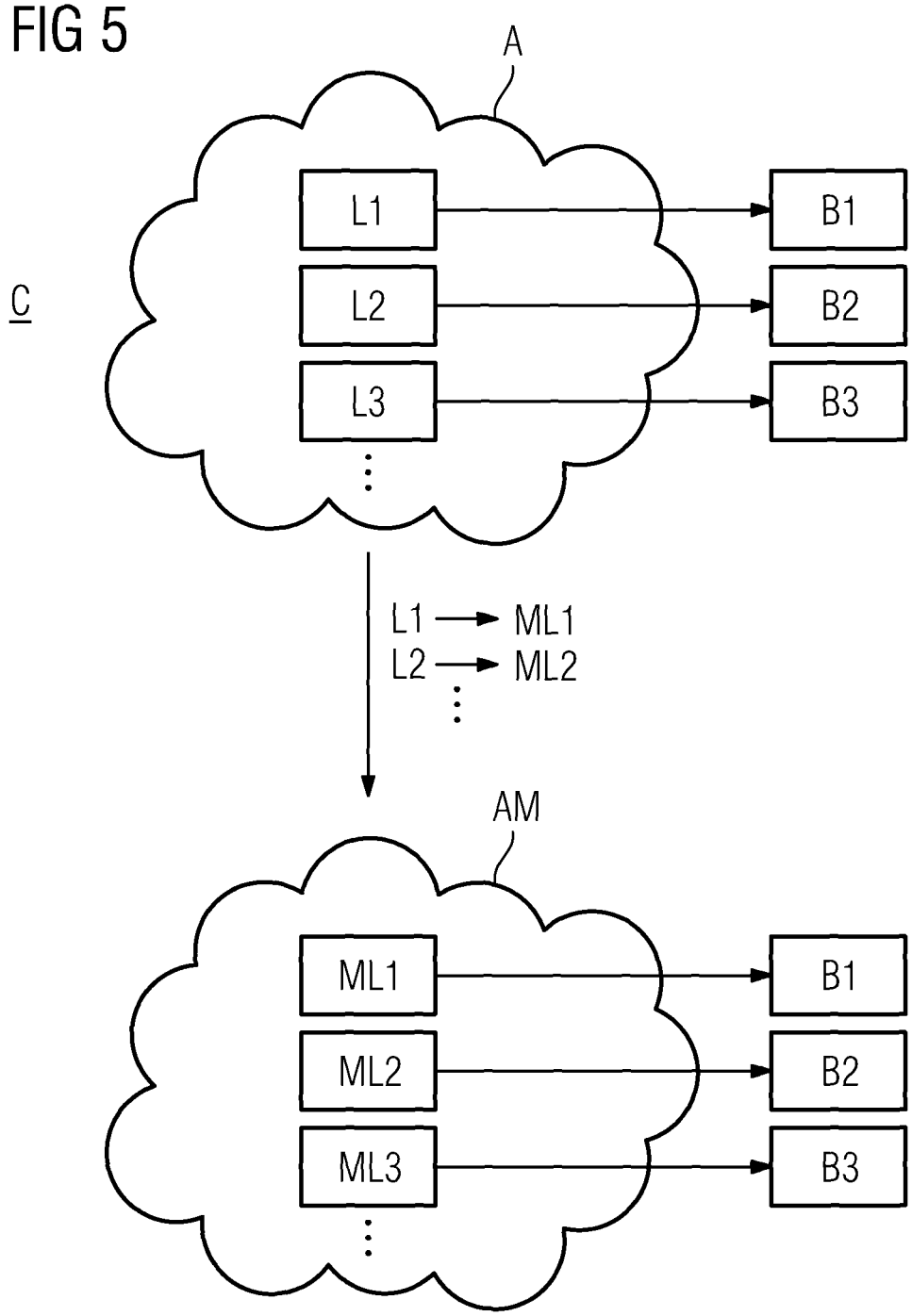
FIG. 5 illustrates the principle of generating a modified referencing object.

Requests M205 are most preferably HTTP Requests and responses M207 are most preferably HTTP Replies. The responses M207 may comprise at least one referencing object A and at least one but most preferably a number of referenced objects B1, B2, B3, . . . . In our Example (cf. FIG. 5), the referencing object A is the original web page and the referenced object B1 is object www.example.com/image.png. In the Example, the referencing object A and the referenced objects B1 make out the requested content C.

Example

The Original Web Page

```
<!DOCTYPE html>
<html lang="en">
<head>
    <meta charset="utf-8">
    <title>Cats Who Code demo</title>
</head>
<body>
    <div>
        <header>
            <h1 id ="logo"><a href="#">Cats Who Code</a></h1>
        </header>
        <!-- orginal line -->
            <img src='http://www.example.com/image.png' />
        <!-- orginal line -->
        <div>
        <h2>Paris, France</h2>
            <p>A cat that can program computers is a
particularly interesting animal. For those who do not know
yet, also this text was written by the smart cat.</p>
```

-continued

```
        </div>
    </div>
</body>
</html>
```

The referencing object A may be stored locally at the server 120 so that it does not necessarily need to be retrieved, in particular when the server 120 is a web server. If the server 120 is a proxy server, though, then the server 120 most probably needs to request also the referencing object A from the remote server 140 that may be a web server or any other server.

In step P205 server 120 parses the referencing object A, i.e. the main HTML page, and replaces all or at least some external links L1, L2, . . . with internal links ML1, ML2, . . . i.e. links with the "filesystem" prefix. The result is the modified referencing object AM.

In our Example, link L1 thus becomes modified link ML1: "http://www.example.com/image.png" is changed to "filesystem:http://www.example.comtemporary/image.png". We see that it suffices to add to the external link L1, L2, . . . a suffice only to obtain the modified link ML1, ML2, . . . ; the suffice may in particular be as simple as the text "filesystem:" or any other suitable identifier.

Example (Cont'd)

The Modified Web Page

```
<!DOCTYPE html>
<html lang="en">
<head>
    <meta charset="utf-8">
    <title>Cats Who Code demo</title>
</head>
<body>
    <div>
        <header>
            <h1 id ="logo"><a href="#">Cats Who Code</a></h1>
        </header>
<!-- modified line -->
        <img
src='filesystem:http://www.example.com/temporary/image.png'
/>
<!-- modified line -->
        <div>
            <h2>Paris, France</h2>
                <p>A cat that can program computers is a
particularly interesting animal. For those who do not know
yet, also this text was written by the smart cat.</p>
        </div>
    </div>
</body>
</html>
```

In step P207 server 120 bundles some or all referenced objects B1, B2, B3, . . . . The bundling can be carried out by using an archiving program that do not use compression (such as TAR) or that uses compression (such as ZIP).

Then server 120 sends the at least one bundle by using the WebSocket WS to the terminal 10 (denoted by message M209). The terminal 10 in step P209 receives the bundle and saves the bundle locally, extracts the objects B1, B2, B3, . . . from the bundle and stores them locally in browser filesystem.

It must be understood that the bundling in step P207 is optional. If the objects B1, B2, B3, . . . are not stored in at least one bundle, they are transmitted one by one from server 120 to terminal 10 as messages M209. We see that also in this case the transmission is carried out by using the WebSocket WS. After finishing the storing of the objects B1, B2, B3, . . . , terminal 10 sends notification M211 to server 120 that it has finished the storing.

Upon receiving notification M211, server 120 sends (denoted by message M213) the modified referencing object AM to terminal 10 as a HTTP response (cf. FIG. 3).

For storing, the terminal 10 saves the referenced objects B1, B2, B3, . . . in a filesystem at the terminal 10, such as in the temporary storage of the browser.

When the modified referencing object AM is received at the terminal 10, the modified links ML1, ML2, ML3, . . . point to the referenced objects B1, B2, B3, . . . stored locally in the filesystem of the terminal 10. In other words, the modified links ML1, ML2, ML3, . . . give references for the browser at the terminal 10 to locate the referenced objects B1, B2, B3, . . . from the local filesystem of the terminal 10.

In step P211, the terminal 10 retrieves and renders the referenced objects B1, B2, B3, . . . based on the modified referencing object AM. One sees that the result is that the content C requested by the terminal 10 with message M201 is reproduced at terminal 10 but in such a manner that the referencing object A is received at terminal 10 only after the referenced objects B1, B2, B3, . . . were first loaded at the terminal 10 via the WebSocket WS.

Figure 2:
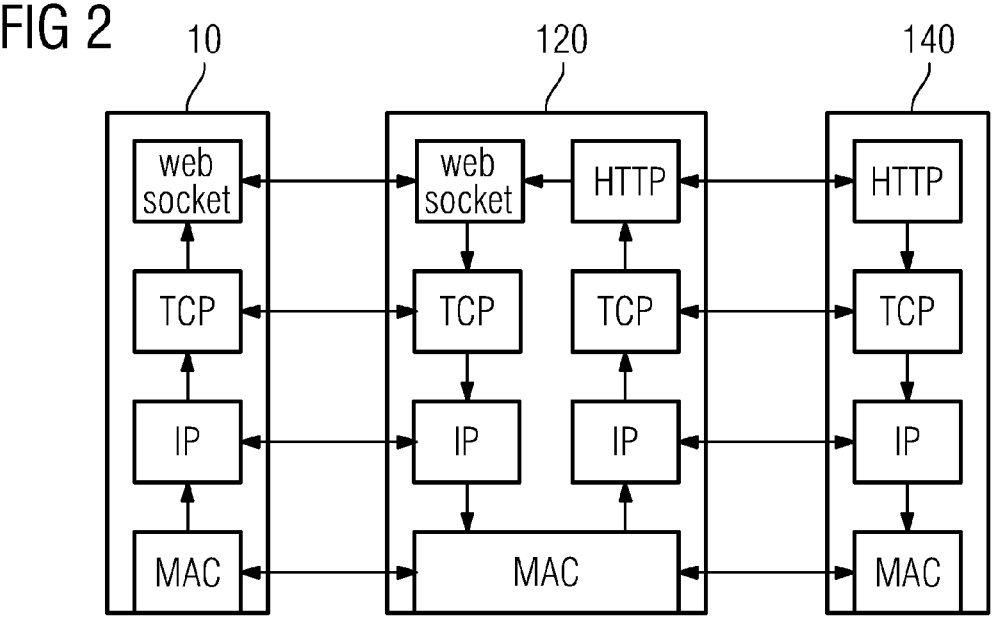
FIG. 2 illustrates the server loading of objects over HTTP protocol and sending the objects to the terminal via WebSocket.

To summarize, FIG. 2 illustrates the principle in more detail: the server 120 retrieves, in addition to the referencing object A that may optionally be retrieved, the referenced objects B1, B2, B3, . . . from at least one remote server 140 by using the HTTP protocol. Then the server 120 transmits the referenced objects B1, B2, B3, . . . over the WebSocket WS to the terminal 10.

In our implementation of the server 120 and method according to the invention, all instructions from the server 120 to client are sent in response M203, which contains the instructions of 1) to set up a WebSocket WS following the WebSocket standard Example Javascript Code to Set Up WebSocket:

```
var websocket = new
    WebSocket("ws://192.168.0.1:8888")
```

2) to set up filesystem following the draft standard of FileSystem.

Example Javascript Code to Set Up FileSystem:

```
window.requestFileSystem(window.TEMPORARY, 1024*1024,
function(filesystem)
```

3) to receive web objects via WebSocket WS and store them in the memory allocated by browser Example in Pseudo Code:

```
// when one object is received via websocket WS, it
is written into FileSystem
    websocket.onmessage = function (evt) {
        // Create a FileWriter object for our
FileEntry (fileName).
        fs.root.getFile(fileName, {create: true},
function(fileEntry) {
            fileEntry.createWriter(function(fileWriter) {
```

```
            fileWriter.onwriteend = function(event) {
                debug('Write completed.');
        };
                var writer = new BlobBuilder( );
                writer.append(content);
                fileWriter.write(writer.getBlob(type));
                }, errorHandler);
        };
```

4) when all referenced objects B1, B2, B3, . . . are stored in filesystem, the code generates notification M211, which is for informing the server 120 to send the modified referencing object AN.

Example Javascript Code to Sent Notification M211 that is Basically a HTTP Request Appended with a Special String "//filesystem//":

```
        window.location.href =
            'http://www.example.com//filesystem//';)
```

The functionality of the instructions in response M203 is like the client software and all the necessary functions are just reinterpreted in javascript.

Instead of installing client-side software in the operating system of terminal 10, in our implementation the functions are installed on-the-air. Since all referenced objects B1, B2, B3, . . . are already inside the browser and modified links ML1, ML2, ML3, . . . already give enough indication for the browser to find where these referenced objects B1, B2, B3, . . . are, modified referencing object AM only needs to contain the referencing object A (original HTML page) wherein links L1, L2, L3, . . . have been replaced with modified links ML1, ML2, ML3, . . . . The invention is not to be understood to be limited in the attached patent claims but must be understood to encompass all their legal equivalents.

The invention claimed is:

1. A Hyper Text Transfer Protocol (HTTP) server (120) configured to:
   in response to receiving HTTP request (M201) for content (C) from a terminal (10) over a first communication channel:
   a) respond (P201) to the terminal (10) with a Hyper Text Markup Language (HTML) response (M203) containing instructions configured to set up a bi-directional second communication channel Web-Socket (WS) at the terminal (10) in the form of a standard WebSocket connection, for establishing bi-directional communication between the HTTP server (120) and the terminal (10) over said bi-directional second communication channel WS;
   b) load (M205, M207) the requested content (C) comprising at least one referencing object (A) and a plurality of referenced objects (B1, B2, B3, . . . ) belonging to said requested content (C), wherein the referencing object (A) is a hypertext markup language page and the referenced objects (B1, B2, B3, . . . ) are web objects referred to in said hypertext markup language page;
   c) generate a modified referencing object (AM) by replacing, in the referencing object (A), links (L1, L2, L3, . . . ) to said plurality of referenced objects (B1, B2, B3, . . . ) that are external links with modified links (ML1, ML2, ML3, . . . ), said modified links (ML1, ML2, ML3, . . . ) pointing to a locally stored version of the plurality of referenced objects (B1, B2, B3, . . . );
   d) send the plurality of referenced objects (B1, B2, B3, . . . ) to the terminal (10) over the bi-directional second communication channel WS; and
   e) after the HTTP server (120) has sent the plurality of referenced objects (B1, B2, B3, . . . ) to the terminal (10) over the bi-directional second communication channel WS, to send the modified referencing object (AM) to the terminal (10) over the bi-directional second communication channel WS in such a manner that the modified links (ML1, ML2, ML3) in the modified referencing object (AM) point to said plurality of referenced objects (B1, B2, B3) already sent to the terminal (10) over the bi-directional second communication channel WS.

2. The HTTP server (120) according to claim 1, wherein the HTTP server (120) is configured to send the plurality of referenced objects (B1, B2, B3, . . . ) to the terminal (10) over the bi-directional second communication channel WS in at least one bundle.

3. The HTTP server (120) according to claim 2, wherein the HTTP server (120) is configured to send the plurality of referenced objects (B1, B2, B3, . . . ) to the terminal (10) in at least one bundle after having sent instructions (M203) to set up the bi-directional second communication channel WS and instructions to save the referenced objects (B1, B2, B3, . . . ) locally at the terminal (10).

4. The HTTP server (120) according to claim 1, wherein the HTTP server (120) is configured to send the modified referencing object (AM) to the terminal (10) over the bi-directional second communication channel WS as HTTP response.

5. The HTTP server according to claim 1, further including a plurality of terminals (10) that preferably are mobile terminals, and wherein the HTTP server (120) is configured for responding to HTTP requests (M201) for content that have been sent by one or more of the plurality of terminals (10).

6. The HTTP server according to claim 5, wherein the HTTP server (120) responds to each of said one or more of the plurality of terminals (10) requesting (M201) content (C) with an HTML response (M203) containing instructions configured to set up a bi-directional second communication channel WS in the form of a standard WebSocket connection at said one or more of the plurality of terminals (10) requesting content (C), for establishing a bi-directional second communication channel WS between the HTTP server (120) and the terminal (10) requesting content (C); wherein the HTTP server (120) is configured to load (M205, M207) the requested content (C) comprising at least one referencing object (A) and the plurality of referenced objects (B1, B2, B3, . . . ) belonging to said requested content (C); wherein the referencing object (A) is a hypertext markup language page and the plurality of referenced objects (B1, B2, B3, . . . ) are web objects referred to in said hypertext language page; wherein said HTTP server (120) is configured to generate a modified referencing object (AM) by replacing, in the referencing object (A), links (L1, L2, L3, . . . ) to the plurality of referenced objects (B1, B2, B3, . . . ) that are external links, with modified links (ML1, ML2, ML3, . . . ) that point to a locally stored version of the same object (B1, B2, B3, . . . ); and wherein said HTTP server (120) sends the plurality of referenced objects (B1, B2, B3, . . . ) to the terminal (10) over the bi-directional communication channel WS, and subsequent to said HTTP server (120) sending said plurality of referenced objects (B1, B2, B3, ... ) to the terminal (10) over the bi-directional second communication channel WS, said HTTP server (120) sends the modified referencing object (AM) to the terminal (10) in such a manner that the modified links (ML1, ML2, ML3) in the modified referencing object (AM) point to plurality of referenced objects (B1, B2, B3) already sent to the terminal (10).

7. The HTTP server according to claim 1, wherein said Hyper Text Markup Language (HTML) response (M203) from the HTTP server (120) to the terminal (10) containing instructions configured to set up a bi-directional second communication channel WS at the terminal (10) in the form of a standard WebSocket connection further includes instructions from said HTTP server (120) over the bi-directional second communication channel WS causing said terminal (10) to:
- set up a file system according to the FileSystem standard;
- receive said plurality of referenced objects (B1, B2, B3, ... ) over said bi-directional second communication channel WS set up as a standard WebSocket connection; and
- store said received plurality of referenced objects (B1, B2, B3, ... ) in memory of said terminal (10) according to the FileSystem standard, said memory allocated by a web browser operating on said terminal (10); and wherein after said HTTP server (120) sends the plurality of referenced objects (B1, B2, B3, ... ) to the terminal (10) over the bi-directional second communication channel WS and after said plurality of referenced objects (B1, B2, B3, ... ) are stored in said allocated terminal (10) memory, said server configured for receiving from said terminal (10) over the bi-directional second communication channel WS a notification (M211) causing said HTTP server (120) to send the modified referencing object (AM) to said terminal (10) over the bi-directional second communication channel WS.

8. A method for operating a HTTP server (120), comprising the acts of:
- in response to receiving a Hyper Text Transfer Protocol (HTTP) request (M201) for content (C) from a terminal (10) over a first communication channel, said HTTP server programmed to perform the acts of:
  - a) responding to the terminal (10) with a Hyper Text Markup Language (HTML) response (M203) containing instructions configured to set up a bi-directional second communication channel WebSocket (WS) at the terminal (10) in the form of a standard WebSocket connection, for establishing bi-directional communication between the HTTP server (120) and the terminal (10) over said bi-directional second communication channel WS;
  - b) loading (M205, M207) the requested content (C) comprising at least one referencing object (A) and a plurality of referenced objects (B1, B2, B3, ... ) belonging to said content (C), wherein the at least one referencing object (A) is a hypertext markup language page and the plurality of referenced objects (B1, B2, B3, ... ) are web objects referred to in said hypertext language page;
  - c) generating a modified at least one referencing object (AM) by replacing, in the referencing object (A), a plurality of links (L1, L2, L3, ... ) to a corresponding plurality of referenced objects (B1, B2, B3, ... ) that are external links with modified links (ML1, ML2, ML3, ... ) that point to a locally stored version of each of the same plurality of referenced objects (B1, B2, B3, ... );
  - d) sending the plurality of referenced objects (B1, B2, B3, ... ) to the terminal (10) over the bi-directional second communication channel WS; and
  - e) subsequent to sending the plurality of referenced objects (B1, B2, B3, ... ) to the terminal (10) over the bi-directional second communication channel WS, sending the modified referencing object (AM) to the terminal (10) over the bi-directional second communication channel WS in such a manner that the modified links (ML1, ML2, ML3, ... ) in the modified referencing object (AM) point to referenced objects (B1, B2, B3, ... ) already sent to the terminal (10).

9. The method according to claim 8, wherein the plurality of referenced objects (B1, B2, B3, ... ) are sent to the terminal (10) in at least one bundle.

10. The method according to claim 9, wherein the plurality of referenced objects (B1, B2, B3, ... ) are sent to the terminal (10) in at least one bundle after the server having performed the act of sending instructions (M203) to the terminal (10) to set up the bi-directional second communication channel WS and instructions to the terminal (10) to save the plurality of referenced objects (B1, B2, B3, ... ) locally at the terminal (10).

11. The method according to claim 8, wherein the HTTP server (120) is configured to send the modified referencing object (AM) to the terminal (10) as HTTP response.

12. The method according to claim 8, wherein said Hyper Text Markup Language (HTML) response (M203) from the HTTP server (120) to the terminal (10) containing instructions configured to set up a bi-directional second communication channel WS at the terminal (10) in the form of a standard WebSocket connection further includes instructions from said HTTP server (120) to said terminal (10) over the bi-directional second communication channel WS causing said terminal (10) to:
- set up a file system according to the FileSystem standard;
- receive web objects over said bidirectional second communication channel WS set up as a standard WebSocket connection; and
- store said received plurality of referenced objects (B1, B2, B3, ... ) in memory of said terminal (10) according to the FileSystem standard, said memory allocated by a web browser operating on said terminal (10); and wherein after said HTTP server (120) sends the plurality of referenced objects (B1, B2, B3, ... ) to the terminal (10) over the bi-directional second communication channel WS and after said plurality of referenced objects (B1, B2, B3, ... ) are stored in said allocated terminal (10) memory, said terminal (10) configured to send a notification (M211) to said HTTP server (120) over the bi-directional second communication channel WS causing said HTTP server (120) to send the modified referencing object (AM) to said terminal (10) over the bi-directional second communication channel WS.

* * * * *